United States Patent
Montroy et al.

(10) Patent No.: US 6,523,066 B1
(45) Date of Patent: Feb. 18, 2003

(54) DYNAMIC DISTRIBUTED MEMORY LOCKING IN A COMPUTER NETWORK

(75) Inventors: Albert T. Montroy, Melbourne, FL (US); Eric C. Graves, West Melbourne, FL (US); Douglas M. Dyer, Indialantic, FL (US)

(73) Assignee: Harris-Exigent, Inc., Melbourne, FL (US)

( * ) Notice: Subject to any disclaimer, the term of this patent is extended or adjusted under 35 U.S.C. 154(b) by 0 days.

(21) Appl. No.: 09/379,052

(22) Filed: Aug. 23, 1999

(51) Int. Cl.[7] .............................................. G06F 15/16
(52) U.S. Cl. ...................... 709/229; 709/201; 709/213; 709/228; 707/8; 707/10; 711/147; 711/152
(58) Field of Search ................................. 709/200–203, 709/212–215, 225, 227–229; 707/1, 8–10; 711/145–147, 152–153, 202–203

(56) References Cited

U.S. PATENT DOCUMENTS

| | | | | |
|---|---|---|---|---|
| 5,341,491 A | * | 8/1994 | Ramanujan | 711/152 |
| 5,463,755 A | * | 10/1995 | Dumarot et al. | 711/152 |
| 5,522,045 A | * | 5/1996 | Sandberg | 709/215 |
| 5,678,041 A | * | 10/1997 | Baker et al. | 709/229 |
| 5,913,213 A | * | 6/1999 | Wikstrom et al. | 707/8 |
| 5,987,506 A | * | 11/1999 | Carter et al. | 709/213 |
| 6,047,323 A | * | 4/2000 | Krause | 709/201 |
| 6,272,677 B1 | * | 8/2001 | Lam et al. | 709/201 |
| 6,381,663 B1 | * | 4/2002 | Morrison et al. | 709/200 |

* cited by examiner

*Primary Examiner*—Bharat Barot
(74) *Attorney, Agent, or Firm*—Akerman Senterfitt

(57) ABSTRACT

A method and system for dynamic distributed memory locking in a computer network. According to the method, a local lock process executing on a node receives from an application program a lock request for exclusive access to a memory location. The lock process identifies a first lock process executing on any node of the network that is currently a designated lock manager for granting locks for the particular memory location for which the lock was requested. Subsequently, the local lock process requests from the designated lock manager a lock for the particular memory location. Finally, the local lock process notifies the requesting application program when a lock has been granted by the lock manager. The method also includes designating a local lock process executing on a selected node as the lock manager when no lock manager is currently designated for the particular memory location for which a lock has been requested. The application program and the local lock process can both be executing on the same selected node, but can also be executing on separate nodes.

23 Claims, 8 Drawing Sheets

DYNAMIC DISTRIBUTED MEMORY LOCKING IN A COMPUTER NETWORK

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention concerns a method for locking of critical memory regions in a multiple workstation environment utilizing shared data.

2. Description of the Related Art

Satellite ground stations today are required to process and distribute more data from even more space vehicles (SVs) than ever before (or even imagined). In the past, a ground station would have a single SV in view at any given point in time or in the case of a station supporting geosynchronous systems, separate hardware systems dedicated to a single SV would perform the isolated processing to determine vehicle state. Newer satellite constellations containing up to 80 SVs are being supported by ground stations consisting of up to 50 workstations, which are constantly sharing data, and performing activities that must be serialized among all processes on all the workstations.

The multiple workstation environment described above results in a distributed system where the shared data is typically replicated within the context of each workstation's memory. The distributed memory and processing creates critical regions that must be protected such that only one process can operate in a critical region at a time. These critical regions may be shared data or instructions to be executed. The problem in guaranteeing a process solitary access to a critical region in a distributed environment is called distributed locking. Significantly, the problem is not unique to the satellite command and control environment and can be encountered in any distributed system of workstations utilizing scarred data.

Distributed locking is the concept of guaranteeing serialized access to a critical region in a multiple processor environment where each processor is operating within the context of it's own memory and cannot access the memory of another processor. For the purpose of understanding the present invention, it is helpful to understand some lock specific terminology as will be used herein. For example a "request" is a solicitation to be granted a lock for access to a critical region. A "grant" is an issuance of a lock in response to a lock request. A "holder" is an instance of a process or thread that has been granted a lock and has not yet released the lock. Finally, a "release" is the act of freeing the lock so that other requests for that lock may be granted. A release is typically performed when access to the critical region is no longer required.

One of the problems associated with distributed locking concerns efficient lock granting. In particular, a difficult obstacle to overcome in designing a distributed locking system is minimizing the amount of work involved in granting a lock. Most solutions for distributed locking typically present an algorithm for lock granting that has a complexity of $N^2$ where N is the number of workstations (nodes) in the system. This means that each time a lock is granted there are $N^2$ inter-process messages or communications between the different nodes to agree on the granting of the lock. In distributed systems, where there is already a lot of network traffic, this solution is inefficient and prohibitive to real time processing. The cost of obtaining a lock grant can exceed time critical windows in which the lock must be granted. The reason for the high amount of communication is to ensure that each node in the system agrees on the state of the lock. There are other algorithms which require a lower number of interprocess messages or communications between different nodes in order to agree on granting the lock. For example, one such system has a complexity of N, where N is the number of nodes in the system. While these alternatives are less expensive in terms of messaging traffic requirements, there are tradeoffs associated with such system as concerns recovering from network or communication failures.

Deadlock is another problem associated with any distributed resource such as locks. Deadlock is a state where no forward progress can be made due to contention for a specific resource. In the case of distributed locks, deadlock is most common in when request is made for a lock that will not be released by a previous holder of the lock. The absence of a release may be due to several different reasons. For example (1) the holder process may have terminated abnormally, (2) the holder process may have deliberately not released the lock, or (3) the node on which the holder process is running may have lost connectivity on the network.

Another problem encountered in distributed locking systems relates to recovery from network failures. a failure in the network can cause a node or group of nodes to become isolated. The loss of network connectivity usually results in either locks that will never be granted until the network is connected again or an expensive process of re-establishing the lock resources when the failure is corrected.

If locks are not granted because of a network failure, the result can be deadlock, reduced performance, or the inability to perform time critical tasks that require the granting of locks. The process of re-establishing lock resources upon regaining connectivity to isolated nodes is very often expensive requiring that all nodes once again communicate with all other nodes to determine the state of the lock. This again is typically an $N^2$ algorithm, where N is the number of nodes.

Yet another problem with distributed locking systems concerns static lock definitions. In particular, most solutions to the distributed lock problem involve the pre-runtime or static definition of all locks in the system. This means that prior to system startup all locks are usually defined and while the system is running no new locks may be created. This can be burdensome in circumstances where it is necessary add functionality to a system, particularly where system downtime must be minimized. For example, if the need for a new/undefined lock to perform a time critical task is needed, then with static lock definitions this could mean brining the distributed system down and restarting. The act of stopping and restarting the system can take an excessive amount of time that a real time system cannot afford.

SUMMARY OF THE INVENTION

The present invention concerns a method for dynamic distributed memory locking in a computer network. According to the method a local lock process executing on a node receives from an application program a lock request for exclusive access to a memory location. The lock process identifies a first lock process executing on any node of the network that is currently a designated lock manager for granting locks for the particular memory location for which the lock was requested. Subsequently, the local lock process requests from the designated lock manager a lock for the particular memory location. Finally, the local lock process notifies the requesting application program when a lock has been granted by the lock manager.

The method can further include the step of designating a local lock process executing on a selected node as the lock manager when no lock manager is currently designated for the particular memory location for which a lock has been requested. The application program and the local lock process can both be executing on the same selected node, but can also be executing on separate nodes.

According to another aspect of the invention, the method can include the step of determining whether an option to create a lock manager is enabled prior to designating the local lock process as the lock manager, and causing the lock request to fail if the option is not enabled. This feature permits a user to control the operation of the distributed locking system by limiting the complexity of a return to connectivity situation after nodes have been disconnected.

According to another aspect of the invention, in response to detecting a loss of connectivity with a node, a local node can determine whether a disconnected lock process executing on the disconnected node has been designated as the lock manager for any the particular memory location. In this situation the local lock process updates a lock manager file to remove the designation of the disconnected lock process as lock manager for the memory location.

Upon detecting a return of connectivity with any node which is a lock manager, the method further includes the steps of determining whether any conflicting lock manager designations exist with a local list of lock managers and resolving conflicting lock manager designations by a priority designation assigned to each network node. The priority designation is preferably a statically assigned enumerated value which permits a higher priority node to be reassigned responsibility as lock manager upon a return to connectivity.

According to another aspect of the invention, any lock which has been granted by a lock manager can be treated as terminated after a predetermined period of time. However, the system provides users with a further option so that after the predetermined period of time has expired, a lock process requesting a new lock will continue to wait for a release of the previously granted lock to occur before accessing the memory location which is the subject of the existing lock.

The invention can also include a computer network having a dynamic distributed memory locking system. Programming is provided for receiving from an application program a lock request for exclusive access to a memory location; for identifying a first lock process executing on any node of the network that is currently a designated lock manager for granting locks for the memory location; for requesting from the lock manager a lock for the memory location; and for notifying the application program when a lock has been granted.

Suitable programming is similarly provided for designating a local lock process executing on a selected node as the lock manager when no lock manager is currently designated for the memory location. According to one embodiment, the application program and the local lock process are both installed and execute on the selected node. However, the application program and the local lock process can also be executing on separate nodes, and the invention is not intended to be limited in this regard.

According to another aspect of the invention, programming is provided for determining whether an option to create a lock manager is enabled prior to designating the local lock process as the lock manager. In that case, programming is also preferably provided for causing the lock request to fail if the option is not enabled and no lock manager is currently designated.

According to yet another aspect of the invention, programming is provided which is responsive to detecting a loss of connectivity with a node. Such programming is configured for determining whether a disconnected lock process executing on the disconnected node has been designated as the lock manager for the requested memory location. If so, the system updates a lock manager file on the local node to remove the designation of the disconnected lock process as lock manager for the memory location.

Finally, the computer network system preferably includes programming responsive to detecting a return of connectivity with any node which is a lock manager. Such programming determines whether any conflicting lock manager designations exist by comparing the connecting node's lock manager file with a local list of lock managers. In addition such programming preferably resolves conflicting lock manager designations by a priority designation of each network node. The priority designation is preferably a statically assigned enumerated value. However, it will be appreciated that the invention is not limited in this regard and other priority designation schemes may also be used.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE INVENTION

The present invention provides lock granting with a complexity of 1. The complexity of 1 indicates that there is only one inter-process message needed to request a lock and the number of communications is not related to the number of nodes in the system. The Fault Tolerant Dynamic Distributed Locking accomplishes the low level of complexity for lock granting by designating only one node as the "Lock Manager" for that lock. All nodes can be managers of different locks but there is only one manager per lock.

Figure 1:
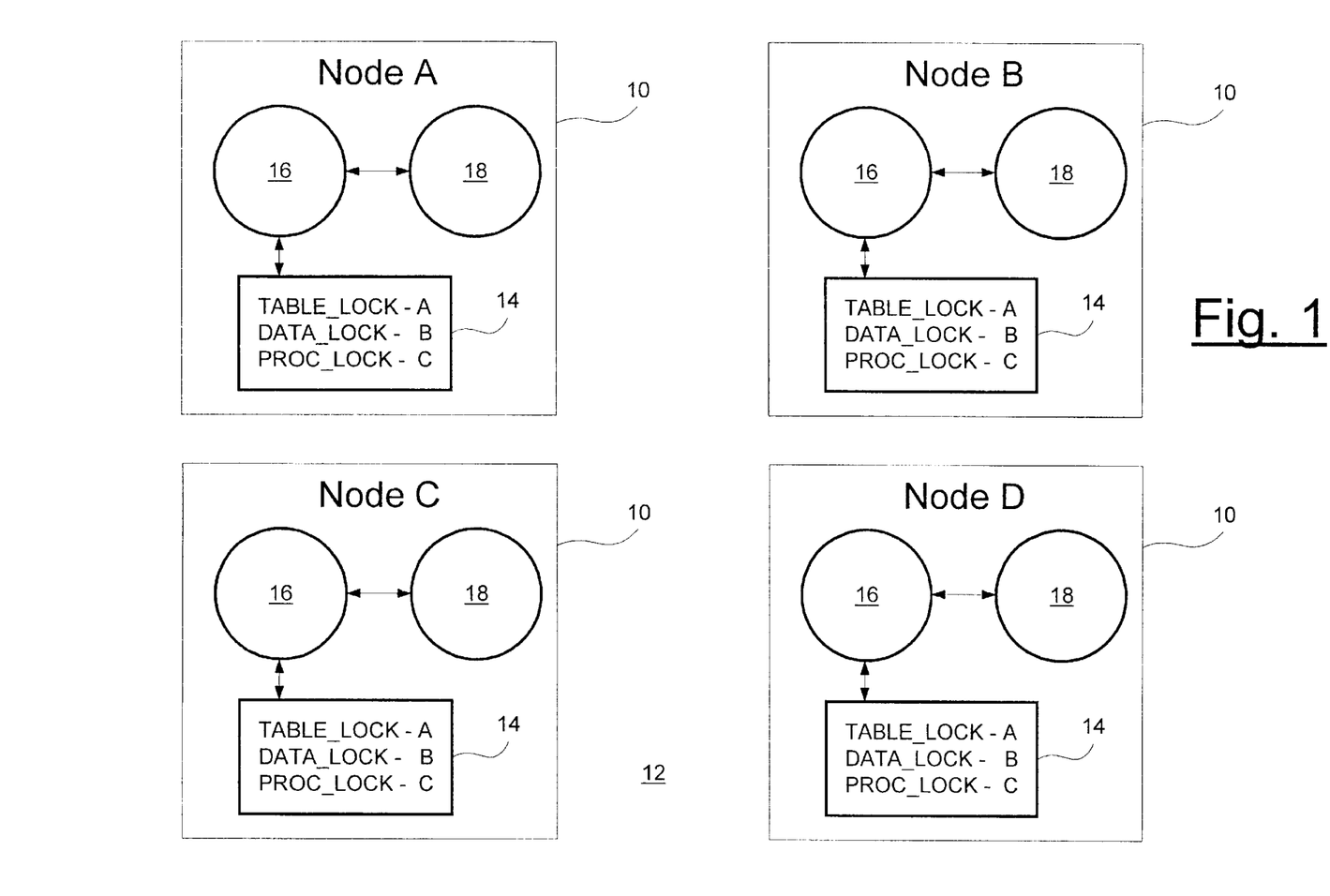
FIG. 1 is a block diagram showing a set of network nodes.

FIG. 1 shows a computer network system 12 with four computer network nodes 10. Each node 10 includes a lock process 16 and can also include one or more additional processes 18. Each lock process 16 can also be a lock manager which can manage one or more locks. For example, in FIG. 1, the manager of the critical table memory is node A. Similarly, the lock manager for the critical data memory is node B, and the lock manager for critical procedure memory is node C. Node D in FIG. 1 is part of the computer network but is not designated as a lock manager.

As shown in FIG. 1, the lock manager information is kept up to date in each node throughout the system. In particular, each node 10 has a lock manager file 14 showing the respective node associated with managing each lock. According to a preferred embodiment, a lock is managed by the node on which the lock is first created. Further, a lock will preferably always be managed by the same node unless the same lock is recreated during a network failure on a node that cannot communicate with the current manager.

Figure 2:
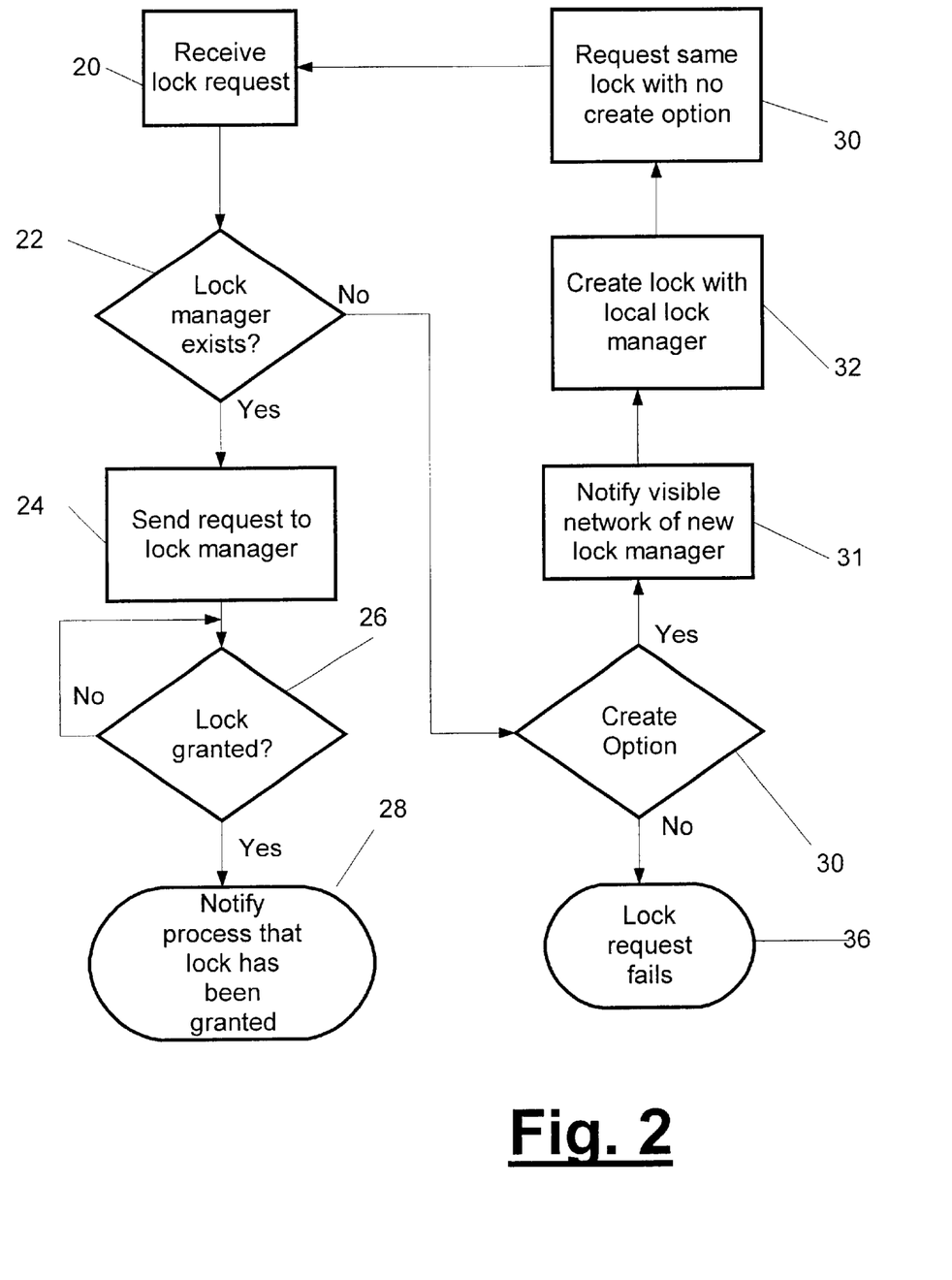
FIG. 2 is a flow chart showing a lock request flowchart for the network of FIG. 1.

Referring to FIG. 2, a process 18 executing on any node 10 which requires a lock will issue to its local lock process 16 a lock request relating to particular data or files. The lock request is received by the lock process 16 in step 20. In step 22, the lock process determines from its lock manager file 14 whether any lock process on an existing node 10 has been designated for managing locks for the particular data or file indicated. For example, if process 18 on node C in FIG. 1 requires a table lock, then in step 22 the lock process 16 for that node would examine its lock manager file 14 and determine that table locks are managed by the lock process 16 on node A.

If it is determined in step 22 that a lock process 16 has previously been designated as lock manager for a particular file or data, then a lock request is sent in step 24 to that designated lock process. Thus, the lock process 16 on node C in the foregoing example would send its request for a table lock to the lock process 16 on node A. If the node requesting the lock is the same node which manages the requested class of locks, then the lock process 16 for that node preferably proceeds to directly process the lock request. In either case, the lock process 16 on the node requesting the lock waits in step 26 for confirmation that the requested lock has been granted by the lock manager. If a message is received from the lock manager indicating that the requested lock has been granted, then the process 18 which initiated the lock request is notified in step 28.

If in step 22, it is determined that no lock process 16 is designated as lock manager with regard to a particular type lock request, or that designated lock process 16 is not otherwise available, then a determination is made in step 30 whether a create option has been enabled. If so, then the local lock process 16 is designated in step 32 as the lock manager for the requested lock. In step 34, the create lock manager option is disabled and the lock request is resubmitted at step 20. Now, in step 22, the lock process 16 will determine that it is the lock manager for the requested data or file and the process will proceed as previously described relative to steps 24, 26 and 28. In step 30, if the user has disabled the create option, the lock request will simply fail in step 36.

Those skilled in the art will recognize that any suitable messaging technique can be used for communicating lock requests and grants between nodes 10 comprising the network. For example TCP/IP messaging techniques or multicast can be used for this purpose.

Figure 3:
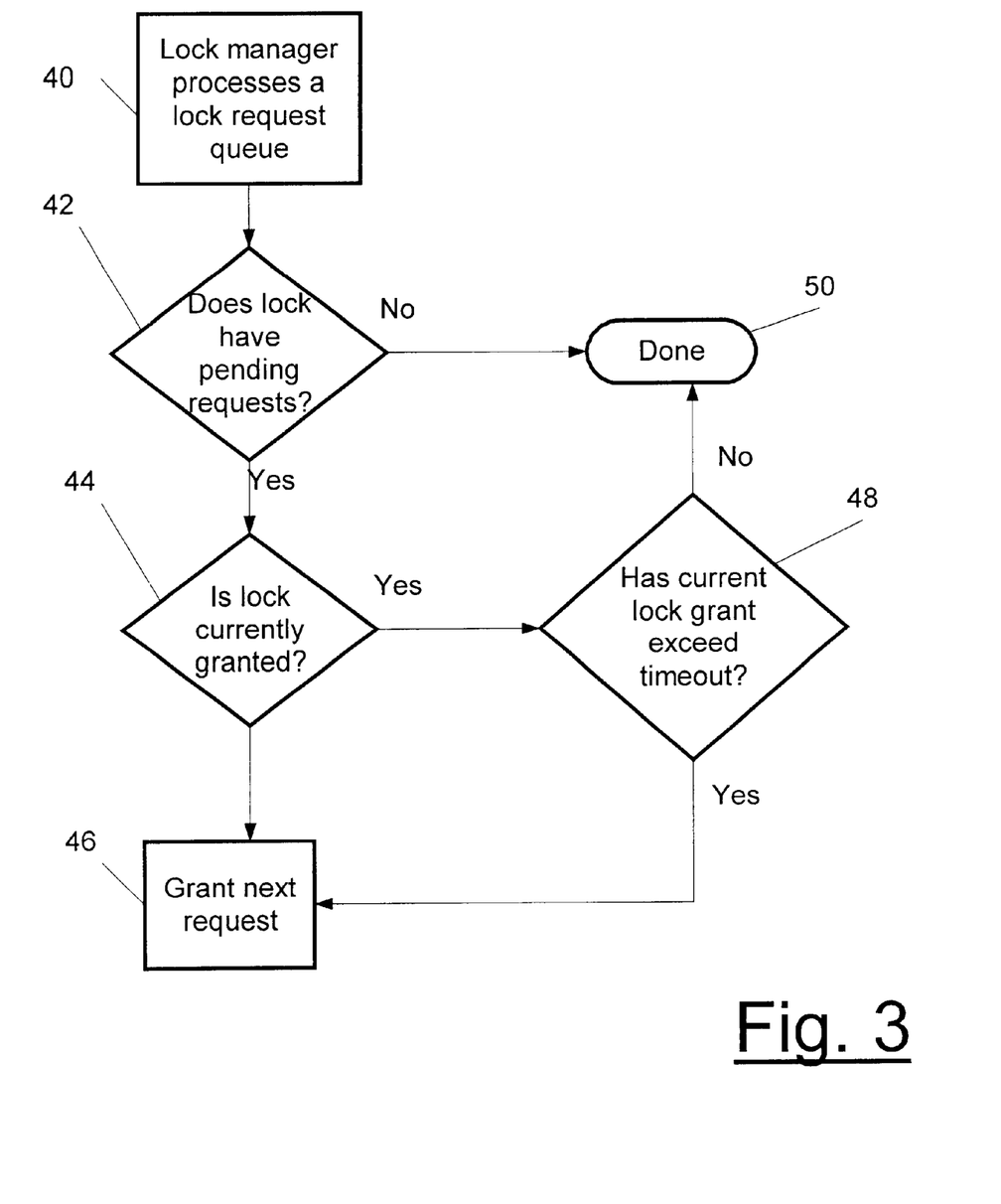
FIG. 3 is a flow chart showing a deadlock avoidance flow chart for the network of FIG. 1.

FIG. 3 is a lock process 16 flowchart showing the way in which lock requests are processed when the particular lock process has been designated as a lock manager. Lock requests received from various nodes 10 are stored in a lock request queue for processing in step 40. In step 42, a determination is made as to whether a lock request is pending. If so, the process checks in step 44 as to whether a lock is currently granted for the relevant data or files. If no lock is currently granted, the lock process 16 will grant the request and will send a confirming message in step 46 to the lock process which originated the request.

Alternatively, if it is determined in step 44 that a lock is already granted, then in step 48 a determination can be made as to whether the current grant has exceeded a timeout period. If so, then the requested lock will again be granted in step 46 as described above. If the current grant has not exceeded the timeout then the process terminates in step 50 until the next lock request processing cycle.

As shown in FIG. 3, the problem of deadlock is preferably solved in the present invention with the use of a configurable lock timeout in step 48. The lock timeout, which is preferably configurable by the user, allows a lock to be granted for other requests after the configurable. amount of time has passed, regardless of a release from the holder.

The user of the distributed locking system also preferably has the ability to use or ignore the timeout associated with locks via the logic in the processes that make use of the locking interfaces. The ability to ignore the timeout mechanism allows the user more control to tailor the locking to the specific needs of the system. If a timeout on a lock grant occurs, the user can choose to ignore the timeout and attempt to ascertain the state of the holding process to maintain the integrity of the critical region prior to requesting the lock again. If the timeout is ignored and the user does not take the steps to query the state of the holder, then any deadlock that occurs as a result is considered part of the system design.

With the locking system as described herein, the loss of network connectivity will not result in the types of problems experienced by conventional systems. For example, the system prevents the occurrence of (1) locks that cannot be granted until the network is connected again or (2) a time consuming process of re-establishing the lock resources when a network failure is corrected.

Figure 4:
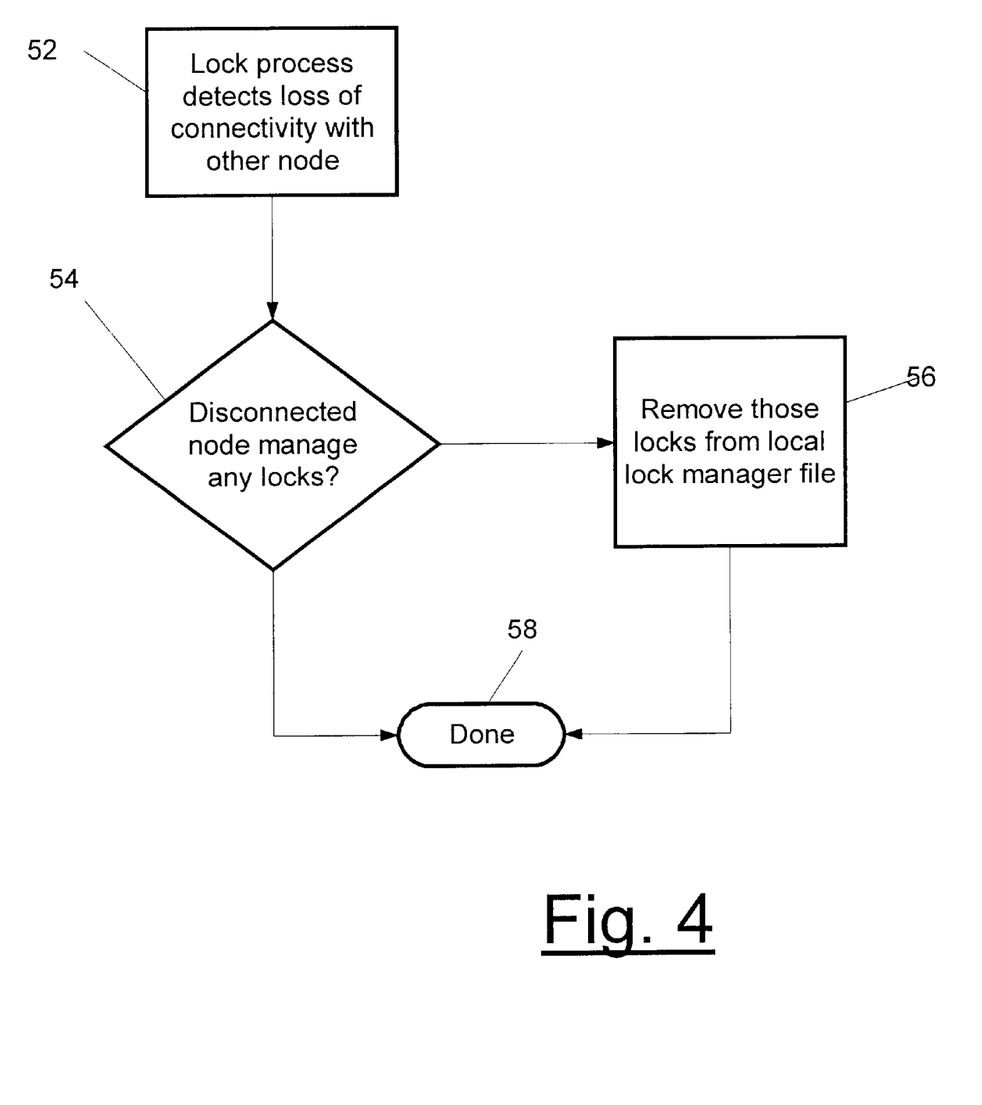
FIG. 4 is a flow chart showing a loss of connectivity flowchart for the network of FIG. 1.

FIG. 4 is a flowchart illustrating the steps performed by a lock process 16 when a loss of connectivity occurs among nodes 10 of network 12. In step 52, a lock process 16 detects loss of connectivity with other nodes of network 12. In step 54, a determination is made as to whether any of the disconnected nodes were designated as lock managers. If so, then the lock process 16 updates the lock manager file 14 in step 56 to remove any designation of those nodes as lock managers. It should be noted that once the lock manager file 14 has been updated in step 56, then step 22 in FIG. 1 will return a negative result for any lock request in which the disconnected nodes 10 were formerly designated lock manager. If in step 54, none of the disconnected nodes 10 include a lock process 16 which has been designated a node manager, then the process does not update the lock manager file 14 and the process is done at step 58.

As previously explained relative to step 30 of FIG. 1, the user has the option to permit a new lock to be created if the manager of the desired lock has become isolated from a particular node's view (and therefore deleted from the lock manager file in step 56). If the create option is enabled, then in step 32 the node 10 requiring the lock is designated the manager for that lock within the scope of that node's visible network.

Figure 5:
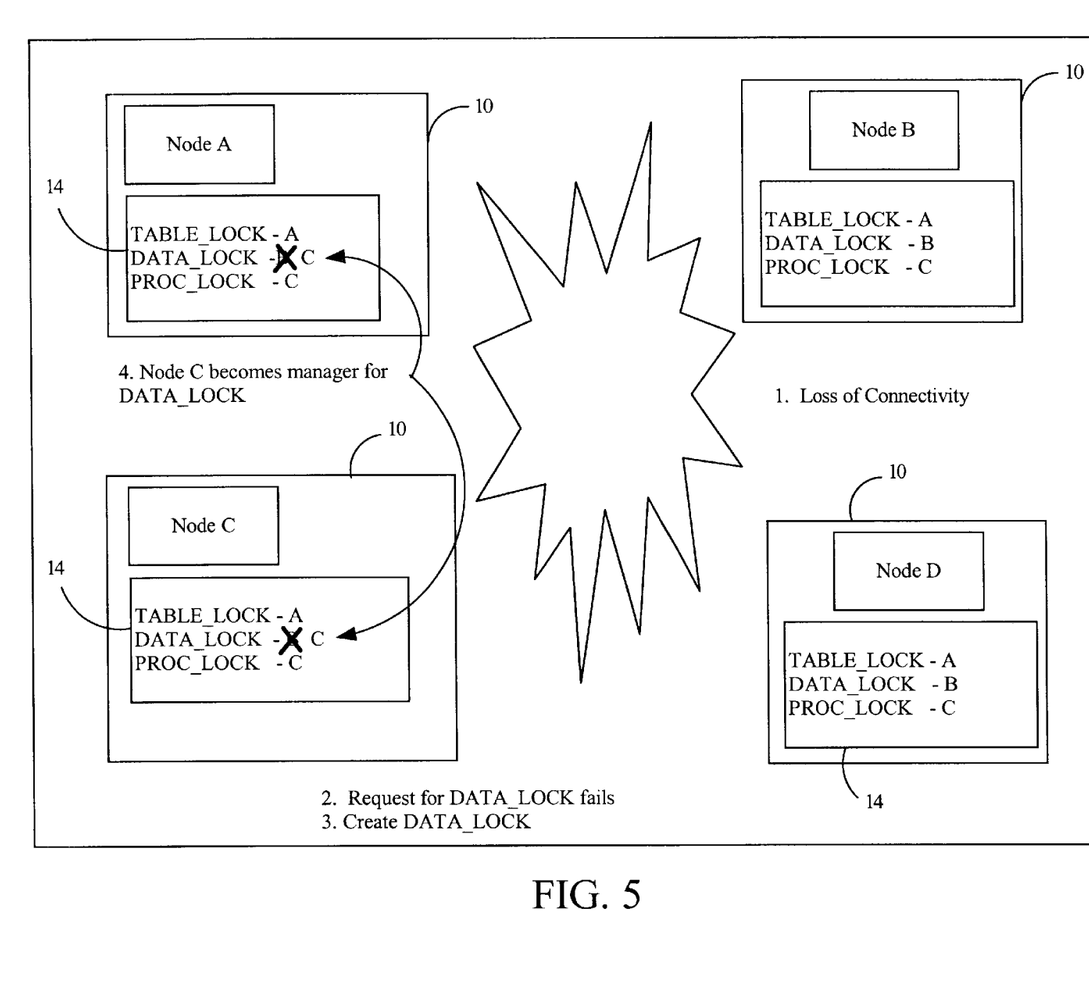
FIG. 5 is a block diagram of the network nodes in FIG. 1 when connectivity is lost.

FIG. 5 illustrates an example of a network where Nodes A and C lose connectivity with nodes B and D. For the purposes of improved clarity, processes 16 and 18 are not shown in FIG. 5. It will be noted that prior to the loss of connectivity, B managed the DATA_LOCK lock. After the loss of connectivity, the lock process on node C recreates the lock as described relative to FIG. 1 steps 22, 30 and 32. Referring to FIG. 5, the events or steps involved are as follows:

1. Nodes A and C lose connectivity with nodes B and D.
2. A process on node C request the DATA_LOCK lock but the request fails in step 22 of FIG. 1 because the lock no longer exists.
3. In step 32 the process on node C recreates the DATA_LOCK lock.
4. Node C sends a message to its visible network (in this case, node A) directing each lock process 16 to update its lock manager file 14 to reflect that node C is now the lock manager for DATA_LOCK.

When there are multiple managers for a single lock, a lock conflict results.

For the purpose of re-establishing lock resources when connectivity returns to the network, the dynamic distributed locking system of the present invention has an algorithm with N complexity, where N is the number of nodes in the network. According to a preferred embodiment, lock conflict resolution makes use of node priority to determine the true manager of the lock. Node priority is preferably a statically assigned enumerated value where each node has a unique priority. For example, node priority may be defined in a configuration file that is processed at system startup. The configuration file can contain the name of each node in the lock system and a corresponding priority. Each node preferably has a different priority and each node has the same view of the system with respect to the priority assignments in the configuration file.

In an alternative embodiment, node priority can be assigned simply by comparing the different node names through an alpha-numeric string comparison which always results in any two different nodes having a greater than/less than relationship. Those skilled in the art will appreciate that the foregoing methods for defining node priority are merely exemplary in nature and that the node priority assignments can be achieved through numerous means in the implementation provided that each node has a resulting unique priority assigned thereto for the purpose of resolving lock conflicts.

Figure 6:
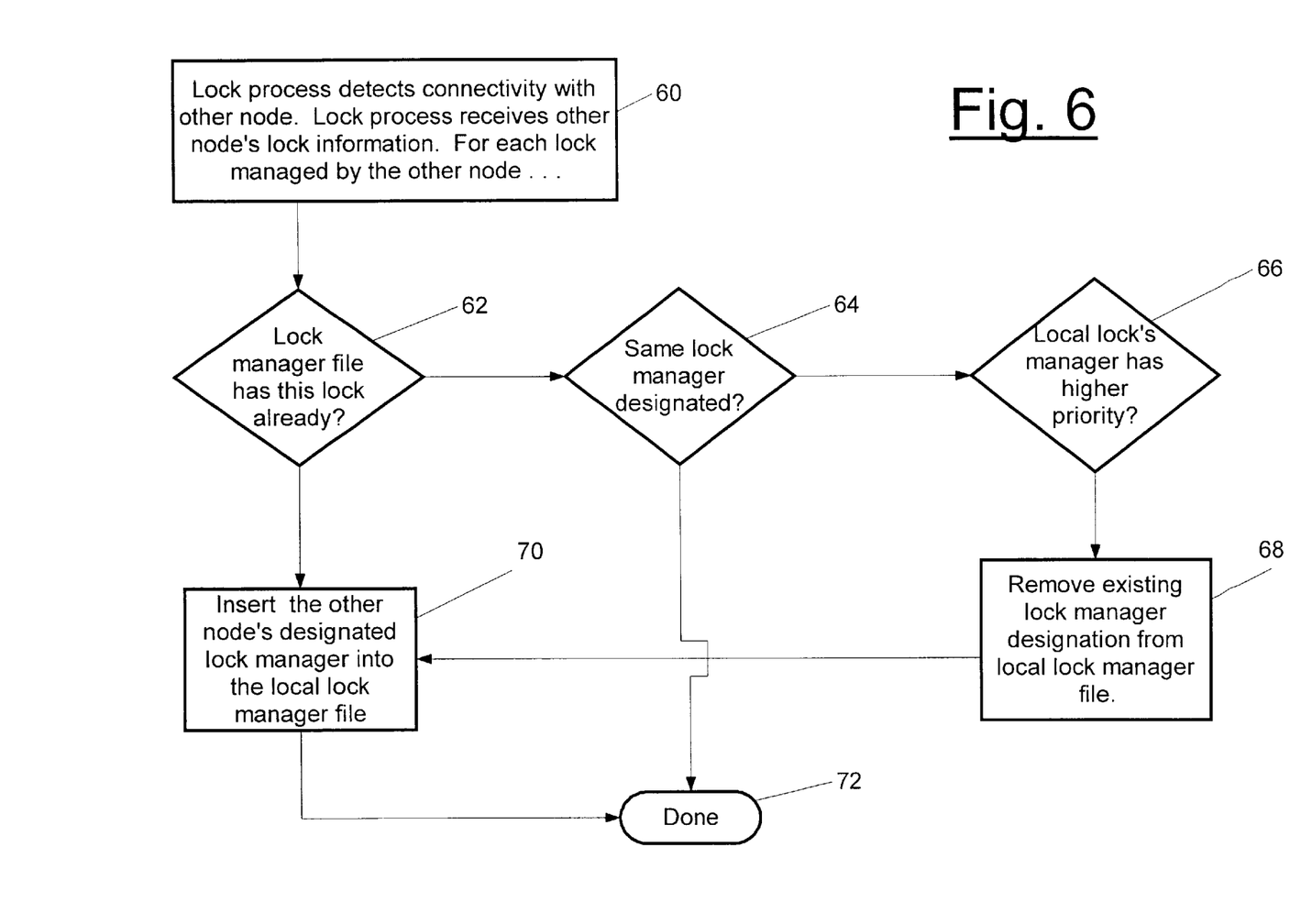
FIG. 6 is a flow chart showing a return to connectivity for the network of FIG. 1.

FIG. 6 is a flowchart illustrating the steps associated with a return of connectivity and resolution of lock conflict in network 12. In step 60 a lock process 16 detects connectivity with another node and exchanges lock manager file 14 data with the lock process 16 operating on such node. The system preferably detects nodes leaving or entering the network or locking system by means of a multicasted health and status message that is periodically sent out and received by each lock process on each node. This probing of the network allows the efficient detection of loss of connectivity, resumption of connectivity, or new nodes entering the network/lock system. The sharing of data or information between lock managers is achieved via interprocess communication, such as TCPIP point to point, multicast or any other suitable mechanism available for interprocess communication.

In step 62, for each lock managed by the other node, the local lock process 16 compares the other node's lock manager data to the local lock manager file 14. In step 62, if the local lock manager file 14 has no designation for the particular lock, then the other node's lock designation is used in step 70 to update the local node's lock manager file. However, if the local table also contains a designation for the same type lock, then the system proceeds on to step 64.

A determination is made in step 64 as to whether the designated lock manager in the local lock manager file 14 is the same as the designated lock manager in the other node's data. If the same node is designated, then the designation is confirmed and the local lock manager file 14 is not updated. However, if a determination is made in step 64 that the designated lock manager in the local lock manager file 14 is not the same as the designated lock manager in the other node's data, then the process proceeds on to step 66.

In step 66 a determination is made as to whether the lock manager designation in the local lock manager file has a higher priority than the other node's designation. If so, then the local lock manager file 14 is not updated. However, if the other node's designation has a higher priority, then the designation contained in the local lock manager file 14 is deleted in step 68 and the other node's lock manager designation is used to update the local lock manager file. The process in FIG. 6 preferably continues until data for each lock managed by the other node has been compared to the data in the local lock manager file.

In the example of FIG. 5, it will be appreciated by those skilled in the art that upon return of connectivity, node C shares its data with nodes B and D but not node A. The reason for this is that node C could always see node A, even during the network outage.

Figure 7:
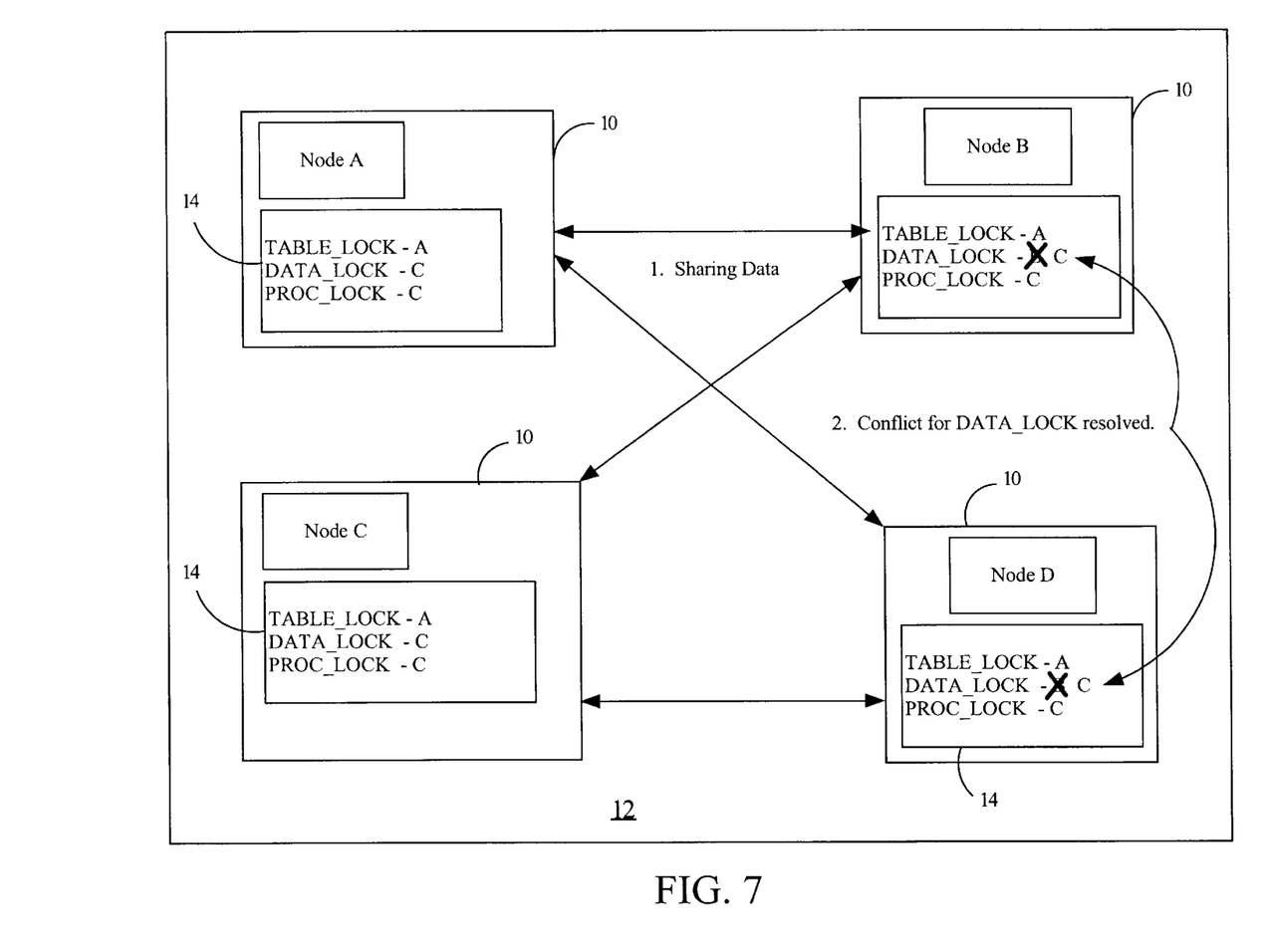
FIG. 7 is block diagram of the network nodes in FIG. 1 showing a return to connectivity.

FIG. 7 depicts connectivity returning to the nodes shown in FIG. 5. For improved clarity, processes 16 and 18 are not shown in FIG. 7. In FIG. 7 if it is assumed that node C has a higher priority than node B, the time line of events listed below results:

1. Nodes A and C share their data with nodes B and D. Nodes B and D share their data with A and C.
2. Lock conflict for the DATA_LOCK is resolved locally on each node with C becoming the manager. No updates are needed on nodes A and C because they already had C as the manager of DATA_LOCK.

Figure 8:
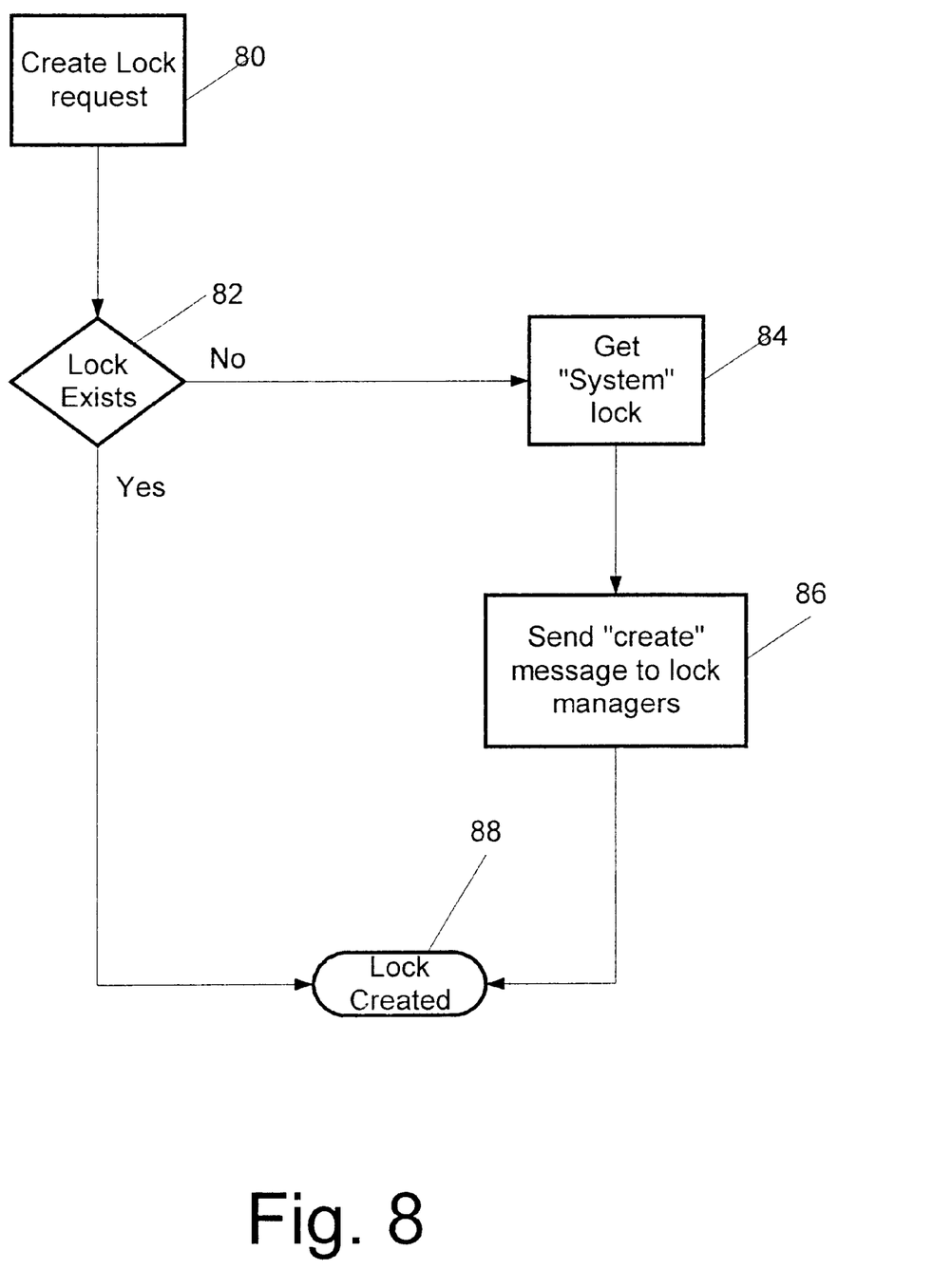
FIG. 8 is a flow chart showing lock creation for the network of FIG. 1.

As shown in FIG. 8 the invention as disclosed herein preferably allows for the creation of any new, previously non-existent locks at runtime. This is called dynamic lock definition. Each lock is uniquely identified by its name and new locks with different names may be created without starting or stopping the system. In step 80, a lock process 16 receives a create lock request and subsequently determines in step 82 whether the requested lock already exists. If so, the system returns a "lock created" notification in step 88 and the process ends. If the requested lock does not currently exist, the lock process requests a system lock in step 84 and in step 86 sends a message to the lock manager (lock process) to create the new lock. In step 88, the process returns the "lock created" notification to the application which initiated the request.

The ability to create new locks at runtime is made possible by internally by using a "hidden" system lock that is created when the system is started. The serialization of lock created through this mechanism guarantees the uniqueness of the lock. The use of the system lock means that there will never be more than one instance of a lock in the "visible" system.

In order to implement the system lock, each lock manager process has a phased startup and defined states that correspond to those phases. As part of that phased startup each lock manager creates the CREATE_LOCK (the "hidden" system lock). Each lock manager subsequently shares its lock manager file information with the other lock managers. Once a particular lock manager has shared this information with other lock managers, that lock manager advances it's state to ONLINE.

The distributed lock system also has an associated state that is derived from the state of all the lock managers in the system. The entire distributed lock system advances to a LOCK_SYSTEM_ONLINE state only when all the lock managers in the visible/connected portion of the system are in an ONLINE state. Thus, if a previously disconnected nodes re-joins the network, the distributed lock system will temporarily revert to an offline state until after each lock process 16 in the distributed network has shared its lock manager information file 14 with the other lock managers and any conflicts as between lock managers have been resolved as previously described.

This phased startup concept at both the node and system granularity allows the lock system to prohibit user applications from performing any lock activity unless the lock system is in a LOCK_SYSTEM_ONLINE state. Thus, the LOCK_SYSTEM_ONLINE state is always a precondition for the distributed lock system performing any lock activity requested by an application. This restriction prevents the corruption of the distributed lock system when a new node/lock manager comes into an existing system or when connectivity returns to a network that has been disrupted. The derived state of the system provides protection during times when lock conflicts may occur and provides the system time to resolve the conflicts. It should be appreciated that within the lock system as described herein, the CREATE_LOCK is really no different than any other lock which the system creates except that the CREATE_LOCK is created, owned, used, and cared for internally with respect to the lock managers.

In view of the foregoing, it will be apparent to those skilled in the art that the present invention has advantages in all of the areas of distributed locking which present issues or obstacles in conventional systems. For example, the system provides the user with lock granting requiring only one interprocess message as opposed to the $N^2$ or N (where N is the number of nodes) required by other solutions. This is very important in a distributed environment since it reduces the amount of traffic on the network and expedites the granting of locks, thereby keeping network traffic flowing without delay or interruption.

Further, because the system of the present invention provides a configurable timeout for locks, and inter-nodal communication regarding the holder of a lock, the problem of deadlock is avoided. The foregoing arrangement permits the user to configure the system to either issue subsequent grants with reliance upon the time-out system, or alternatively require processes to wait for a release on a lock to occur before receiving another grant.

The system also minimizes the impact of network or connectivity failures by limiting the amount of communication needed upon re-connection. The degree of difficulty involved in a network outage are also controllable by the user's choice to recreate or not recreate locks under such circumstances. In any case, when the network is reconnected, the reestablishment of the distributed lock system is optimized by only needing to communicate between those specific nodes where the lock data may have been conflicting.

Finally the system as described herein provides a further advantage in that locks may be defined at runtime. The ability to create new locks at runtime means that the system does not have to be stopped and restarted to add new locks. Since the stopping and starting of a distributed system may take time and detract from productivity, the dynamic creation of locks can be an important advantage.

We claim:

1. A method for dynamic distributed memory locking in a computer network, comprising the steps of:

receiving from an application program an automatically generated lock request for exclusive access to a memory location;

responsive to said lock request, automatically identifying a first lock process executing on any node of said network that is currently a designated lock manager for granting locks for said memory location;

automatically requesting from said designated lock manager a lock for said memory location; and notifying said application program when a lock has been granted.

2. The method according to claim 1 further comprising the step of designating a local lock process executing on a selected node as said lock manager when no lock manager is currently designated for said memory location.

3. The method according to claim 2 wherein said application program and said local lock process are both executing on said selected node.

4. The method according to claim 2 further comprising the steps of:

determining whether an option to create a lock manager is enabled prior to designating said local lock process as said lock manager; and causing said lock request to fail if said option is not enabled.

5. The method according to claim 1 wherein said application program and said lock manager are each executing on separate nodes.

6. The method according to claim 1 further comprising the steps of:

in response to detecting a loss of connectivity with a node, determining whether a disconnected lock process executing on said disconnected node has been designated as said lock manager for any said memory location; and updating a lock manager file to remove the designation of said disconnected lock process as lock manager for said memory location.

7. The method according to claim 1 further comprising the steps of:

upon detecting a return of connectivity with any node which is a lock manager, determining whether any conflicting lock manager designations exist with a local list of lock managers; and resolving conflicting lock manager designations by a priority designation of each network node.

8. The method of claim 7 wherein said priority designation is a statically assigned enumerated value.

9. The method according to claim 1 wherein a lock which has been granted by a lock manager is treated as terminated after a predetermined period of time.

10. The method according to claim 9 wherein after said predetermined period of time has expired, a lock process requesting a new lock will continue to wait for a release of said previously granted lock to occur before accessing said memory location.

11. A computer network having a dynamic distributed memory locking system, comprising:

means for receiving from an application program an automatically generated lock request for exclusive access to a memory location;

means for automatically identifying a first lock process executing on any node of said network in response to said lock request, said first lock process being a currently designated lock manager for granting locks for said memory location;

means for automatically requesting from said designated lock manager a lock for said memory location; and means for notifying said application program when a lock has been granted.

12. The computer network according to claim 11 further comprising means for designating a local lock process executing on a selected node as said lock manager when no lock manager is currently designated for said memory location.

13. The computer network according to claim 12 wherein said application program and said local lock process are both executing on said selected node.

14. The computer network according to claim 12 further comprising:

means for determining whether an option to create a lock manager is enabled prior to designating said local lock process as said lock manager; and means for causing said lock request to fail if said option is not enabled.

15. The computer network according to claim 11 wherein said application program and said lock manager are each executing on separate nodes.

16. The computer network according to claim 11 further comprising:

means responsive to detecting a loss of connectivity with a node for determining whether a disconnected lock process executing on said disconnected node has been designated as said lock manager for any said memory location; and means for updating a lock manager file to remove the designation of said disconnected lock process as lock manager for said memory location.

17. The computer network according to claim 11 further comprising:

means responsive to detecting a return of connectivity with any node which is a lock manager for determining whether any conflicting lock manager designations exist with a local list of lock managers; and means for resolving conflicting lock manager designations by a priority designation of each network node.

18. The computer network according to claim 17 wherein said priority designation is a statically assigned enumerated value.

19. The computer network according to claim 11 wherein a lock which has been granted by a lock manager is treated as terminated after a predetermined period of time.

20. The computer network according to claim 19 wherein after said predetermined period of time has expired, a lock process requesting a new lock will continue to wait for a release of said previously granted lock to occur before accessing said memory location.

21. A method for dynamic distributed memory locking in a computer network, comprising the steps of:

receiving in a local lock process executing on a first node an automatic request from an application program on said first node for exclusive access to a memory location;

responsive to said lock request, automatically identifying a first lock process executing on any node that is a designated lock manager for granting locks for said memory location, by consulting a lock manager file of said first node for a previous lock manager designation, and designating said local lock process as said lock manager if no lock manager is currently designated for said memory location;

automatically requesting from said designated lock manager a lock for said memory location; and notifying said application program when a lock has been granted.

22. The method according to claim 21 further comprising the steps of:

in response to detecting a loss of connectivity with a disconnected node, determining from a lock manager file of said first node whether a disconnected lock process executing on said disconnected node has been designated as said lock manager for any said memory location; and updating said lock manager file on said first node to remove the designation of said disconnected lock process as lock manager for said memory location.

23. The method according to claim 22 further comprising the steps of:

upon detecting a return of connectivity with said disconnected node which is a lock manager, determining whether any conflicting lock manager designations exist as between a lock manager file of said disconnected node said lock manager file of said first node; and resolving conflicting lock manager designations by a statically assigned priority designation of each network node.

* * * * *